United States Patent [19]
Morgan

[11] Patent Number: 5,284,204
[45] Date of Patent: Feb. 8, 1994

[54] HYDRONIC THERMAL DISTRIBUTION SYSTEM FOR SPACE HEATING AND COOLING

[75] Inventor: Dean T. Morgan, Sudbury, Mass.

[73] Assignee: Electric Power Research Institute, Inc., Palo Alto, Calif.

[21] Appl. No.: 698,266

[22] Filed: May 10, 1991

[51] Int. Cl.$^5$ ............... F25B 29/00; F24D 3/02; F24F 5/00

[52] U.S. Cl. ............... 165/22; 165/50; 165/29; 237/59; 237/8 R; 62/434; 62/435; 236/38

[58] Field of Search ............... 165/49, 50, 56, 22, 165/29; 237/59, 56, 8 R; 62/434, 435; 236/51, 38

[56] References Cited

U.S. PATENT DOCUMENTS

| | | | |
|---|---|---|---|
| 3,166,120 | 1/1965 | Butterfield | 165/50 |
| 3,648,766 | 3/1972 | Whalen | 165/50 |
| 3,908,750 | 9/1975 | Siegel | 165/50 |
| 4,011,989 | 3/1977 | Diggs | 165/56 |
| 4,269,172 | 5/1981 | Parker et al. | 165/56 |
| 4,270,596 | 6/1981 | Zinn et al. | 165/49 |
| 4,593,853 | 6/1986 | Schad et al. | 237/56 |
| 4,782,889 | 11/1988 | Bourne | 165/56 |
| 5,022,459 | 6/1991 | Chiles et al. | 165/56 |

FOREIGN PATENT DOCUMENTS

| | | | |
|---|---|---|---|
| 0006683 | 1/1980 | European Pat. Off. | 165/49 |
| 0058132 | 8/1982 | European Pat. Off. | 237/56 |
| 2548024 | 4/1977 | Fed. Rep. of Germany | 237/59 |
| 0157737 | 12/1981 | Japan | 165/56 |
| 0000026 | 1/1983 | Japan | 236/51 |
| 0030918 | 2/1985 | Japan | 165/56 |
| 0213624 | 9/1987 | Japan | 236/51 |
| 0095056 | 7/1989 | Japan | 236/51 |
| 3-170734 | 7/1991 | Japan | 165/53 |
| 1335822 | 10/1973 | United Kingdom | 237/59 |

OTHER PUBLICATIONS

Ashrae Equipment 1983, American Society of Heating, Refrigeration and Air Conditioning Engineers, Inc., copyright 1983 pp. 34.1-34.3.

1987 Ashrae Handbook, "Heating, Ventilation and Air-Conditioning Systems and Applications" (American Society of Heating, Refrigerating and Air Conditioning Engineers, Inc.).

Polyethylene and Polybutylene Pipe and Tubing: A Status Report, Crowson and Chambers, JAWWA, Nov. 1985.

Primary Examiner—John K. Ford
Attorney, Agent, or Firm—Laurence Coit

[57] ABSTRACT

The apparatus of the present invention comprises a hydronic distribution system using prefabricated, flexible cable containing plastic tubing to provide liquid supply and return conduits for the hydronic system. The plastic conduits are enclosed in a foam thermal insulation material which is encased in a flexible, moisture impervious shell. In an alternate embodiment of the invention, the flexible cable includes electrical conductors for supplying power to a fan and for carrying an electrical control signal from a thermostat. The flexible cable thus described can be installed in a building easily and quickly in a manner similar to that currently used for electrical cable.

5 Claims, 5 Drawing Sheets

HYDRONIC THERMAL DISTRIBUTION SYSTEM FOR SPACE HEATING AND COOLING

BACKGROUND OF THE INVENTION

1. Field of the Invention

This invention relates to hydronic space heating and cooling systems used in heating, ventilating and air conditioning systems for residential and commercial buildings.

2. Description of Related Art

Heating, ventilating and air conditioning (HVAC) systems for residential and commercial buildings, use many systems for adding or removing heat from a confined space in order to control the ambient conditions in the space. One such system uses a centralized heat addition or removal system to heat or cool a distribution liquid such as water which is then circulated through a supply conduit to the space of concern. The distribution liquid is then routed to an appropriate heat exchanger and the ambient air of the space which is in thermal connection with the heat exchanger is either heated or cooled to maintain the desired conditions in the space. On exiting the heat exchanger, the distribution liquid is recirculated through a return conduit to the centralized heat addition or removal system.

The hydronic distribution system thus described is typically referred to as a "two pipe" system because the heat exchanger has one supply conduit and one return conduit. When this system is applied to multiple heat exchangers, each located in a separate air conditioning zone, simultaneous heating of one zone and cooling of another zone is not possible. An alternate system called the "four pipe" system uses two centralized units, one for cooling a distribution liquid and one for heating a distribution liquid. The chilled and heated liquids are both routed to the heat exchanger through separate supply and return lines and valves are used to admit either chilled or heated liquid to the heat exchanger depending on ambient conditions in the zone. In this manner, one zone can be in heating mode while another is in cooling mode.

The existing HVAC systems utilizing hydronic distribution are well documented in the American Society of Heating, Refrigeration and Air Conditioning Engineers 1987 *ASHRAE HANDBOOK Volume for Systems and Applications*. Generally, the hydronic distribution systems fall into one of two categories, all water systems or air and water systems. All water systems are characterized by the entire heating or cooling load of the space being carried by the water distributed to the heat exchanger apparatus in the space of concern. Air and water systems distribute both water and air to the space of concern. The water and air are heated or cooled and share in the heat load of the space.

Both of these systems require circulation of water or some other liquid to a heat exchanger in each of the spaces of concern. The heat exchangers used in a building are typically fan coil units containing a finned heat transfer coil, a fan and an air filter. The number of heat exchangers used in a building is dependent on the heating and cooling load and the need to control the heating or cooling in one space or zone independently of other spaces or zones.

In HVAC design it is generally desirable to have as many independently controlled zones as is economically feasible. Having multiple, independently controlled zones allows adjustment of ambient conditions in one zone to suit the occupants without impacting conditions in another zone. In addition, multi-zone systems can maintain uniform conditions throughout a building in spite of variations in the heating or cooling loads between zones caused by differences in thermal insulation, or the quantity of heat generating appliances or occupants in a zone. Also, multi-zone systems are energy efficient because the heating or cooling load for zones which are not in use can be easily isolated. Although more zones improve the performance and efficiency of the HVAC system, they also raise the cost A major component of this increased cost is the material and labor associated with the hydronic distribution system. Each zone must have a heat exchanger requiring a liquid piping system which will convey sufficient quantities of heated or chilled water to accommodate the heating or cooling load. Typically these piping systems use threaded, galvanized, steel pipe or sweat fit, copper tubing.

Installation of these piping systems is labor intensive. Manufactured steel and copper piping or tubing come in straight runs and fittings for accommodating turns and curves. Each connection of a straight run with a fitting requires a joint either threaded or sweat fitted, solder connected. A substantial amount of installation labor is involved in making each joint. For threaded connections, first the pipe must be cut to the appropriate length and then the threads must be cut on the end of the pipe using a pipe threading dye. Next the threads must be dressed, cleaned and coated with a sealing compound or a "TEFLON" tape to prevent leaks. Finally, the connector must be screwed to the pipe end with sufficient thread contact to prevent leaks. In the case of sweat fit solder joints, the labor is comparable in that the tubing must be cut to the proper length, the end of the tubing must be dressed and the then joint must be heated to the proper temperature with a torch to effect a satisfactory solder joint.

Another difficulty with installing these typical systems is that sufficient space must be allocated for the straight runs of piping or tubing in the initial design of the structure. In residential buildings, piping is usually run in the crawl space under the structure. In larger, typically commercial buildings, pipe chases or runs are allocated for running pipes or wiring. In either case, the rigid piping requires hangers or supports spaced between two and five feet apart to adequately support the piping.

In addition to the difficulty in installing these piping systems, there is a substantial problem of maintaining them. As is well known, joints in a piping system are more susceptible to leaks than are the continuous runs of piping materials. Consequently, more joints in a piping system contribute significantly to the additional cost of checking a system for leaks in pre acceptance testing and in maintaining a system after it is installed. Another maintenance problem associated with rigid, metal piping is corrosion caused by oxidation or galvanic action. Corrosion of steel or copper piping causes leaks in the hydronic system which are often located in inaccessible locations requiring time consuming and difficult repair.

Still another problem with rigid piping systems is that they are susceptible to freeze damage during severe weather. If the temperature of the air surrounding the piping drops below the freeze point and there is insufficient flow of water through the piping, the water will freeze and expand until the pipe is split.

It is an object of this invention to reduce the cost of multi-zone HVAC systems used in residential and commercial buildings It is another object of the invention to provide an easily installed hydronic distribution system for multi-zone HVAC systems.

It is another object of the invention to provide a hydronic distribution system which requires minimum maintenance.

It is yet another object of the present invention to provide a hydronic distribution system which is corrosion resistant and more tolerant of freezing conditions than is rigid, metal piping or tubing.

SUMMARY OF THE INVENTION

The apparatus of the present invention comprises a hydronic distribution system using prefabricated, flexible cable containing plastic tubing to provide liquid supply and return conduits for the hydronic system. The plastic conduits are enclosed in a foam thermal insulation material which is encased in a flexible, moisture impervious shell. In an alternate embodiment of the invention, the flexible cable includes electrical conductors for supplying power to a fan and for carrying an electrical control signal from a thermostat. The flexible cable thus described can be installed in a building easily and quickly in a manner similar to that currently used for electrical cable.

DESCRIPTION OF THE PREFERRED EMBODIMENT

Figure 1:
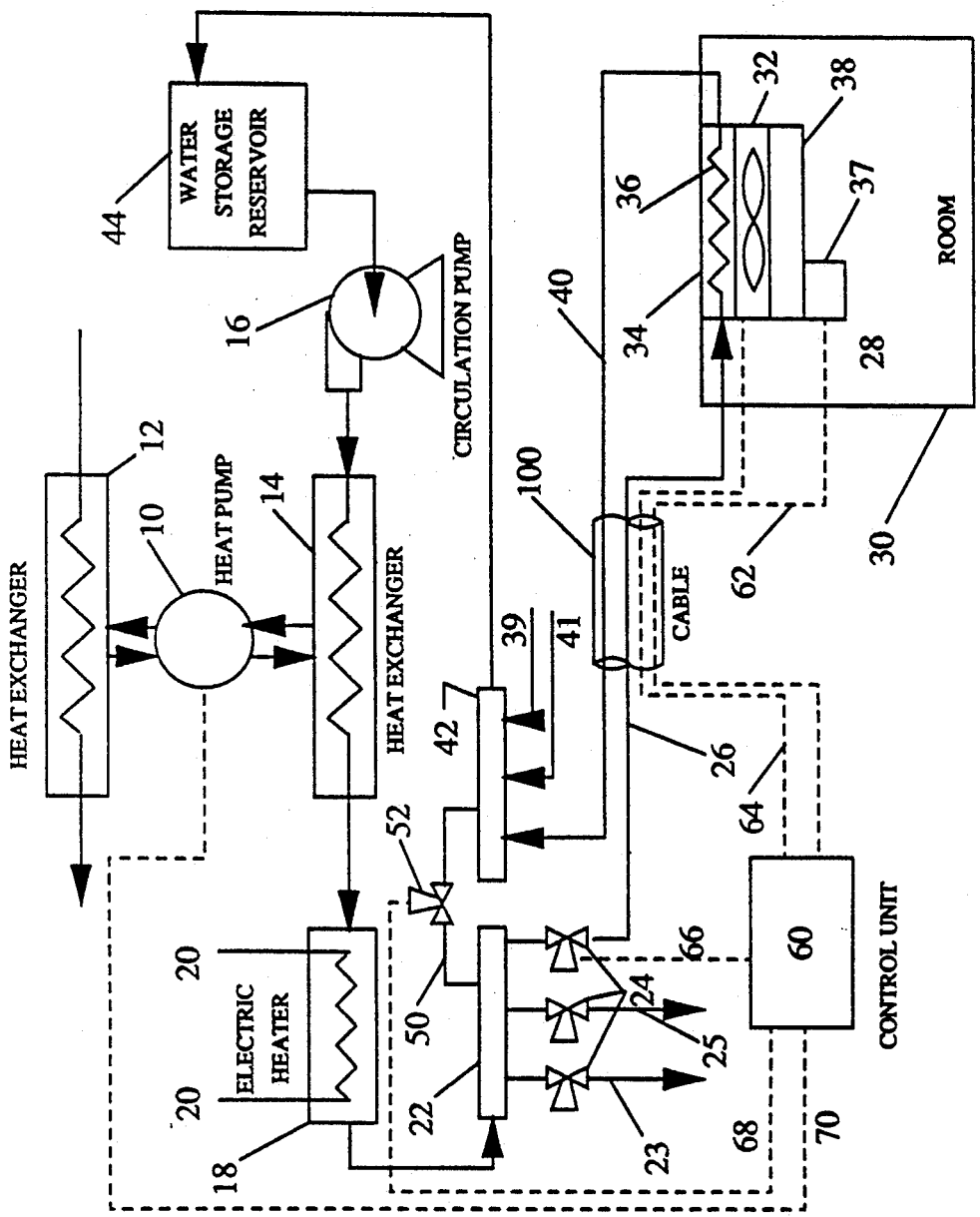
FIG. 1 is a schematic view of a hydronic HVAC system utilizing the liquid distribution flexible cable.

Referring now to FIG. 1, shown is a schematic of the new thermal distribution system as applied with a central air-to-water heat pump. A heat pump 10 circulates refrigerant between heat exchangers 12 and 14. Each of the heat exchangers 12 and 14 have dual functions as either an evaporator or a condenser depending on whether the system is being used in the heating or cooling mode. Heat exchanger 12 transfers heat between the heat pump refrigerant and ambient air while heat exchanger 14 transfers heat between the refrigerant and a secondary distribution liquid such as water. A water circulation pump 16 circulates water through the heat pump condenser/evaporator 14 where it is heated/chilled for space conditioning in the house. The conditioned supply water flows through a supplemental electric heater 18 which is powered by source 20. The electric heater 18 is used to supplement the heat obtained from the heat pump 10 when the heating load exceeds the capacity of heat pump 10. From the electric heater 18, water flows to a manifold 22 located with the central heat pump 10. From the manifold 22, individual supply lines 23, 25 and 26, each controlled by its own on-off solenoid valve 24, go to each room 30 of the residence, supplying conditioned water to the individual room fan coil units 28. For clarity, only one room 30 is depicted in FIG. 1, however, it is understood that the typical application of the present invention would involve a plurality of rooms. To eliminate on-site and labor intensive balancing of the system, orifices (not shown) can be used in each solenoid valve to correct for varying line lengths to different rooms in the house as well as to tailor the hydronic delivery rate to each room according to the estimated and approximate heat demand of the room. Simple nomographs can be used to select the prefabricated orifice size for each room, based on the line run length, room area, window area, and outside perimeter. These orifices can be installed when connecting the lines to the supply manifold.

Each fan coil unit 28 includes a heat exchange unit 34 having a coil 36, a thermostat 37, fan 32, and air filter 38. Return lines 39, 40 and 41 from each room go to the return water manifold 42. From the return manifold 42, the flow goes to the circulating pump suction completing the circuit. A water storage reservoir 44 is used for thermal expansion of the hydronic liquid, assurance of sufficient hydronic liquid in the circuit, and to limit the on-off cycling frequency of the heat pump 10.

For low demand situations (where space conditioning for only one room is required for example), a bypass 50 containing solenoid valve 52 from the supply manifold 22 to the return manifold 42 permits water circulation through the condenser/evaporator 14 at full flow rate. Alternately, a modulating heat pump 10 capable of reduced water flow rate can be used. Since the fan coils 28 will normally be positioned on the exterior perimeter of the room, condensate from air-conditioning operation can be drained by a small diameter tube (not shown) through and down the exterior wall to the ground. Alternatively, a small diameter tube drain (not shown) back to the central unit can be utilized, perhaps with a vacuum assist.

Typically, supply and return manifolds 22 and 42 are physically located near the centralized heat pump unit. Thus supply liquid conduit 26 and return liquid conduit 40 can be routed together to each fan coil unit 28 in each room 30 of the building. In this manner, conduits 26 and 40 can be combined into one cable 100 as shown in FIG. 1. The conduit routing for the present invention uses a prefabricated and flexible supply and return cable 100 which can be strung to each room from the central unit as easily as electrical cable.

Figure 2:
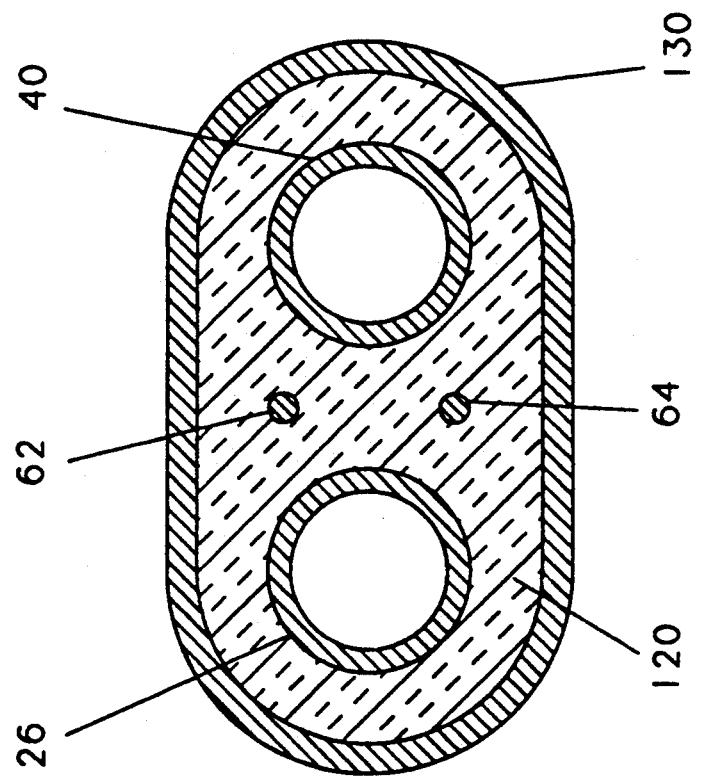
FIG. 2 is a cross sectional view of the cable showing the liquid conduits, foam thermal insulation and plastic shell.

Referring now to FIG. 2, a cross sectional view of the flexible cable 100 is shown. Liquid conduits 26 and 40 are formed from flexible, plastic tubing. Conduit material can be low density polyethylene or polypropylene. Typically one conduit 26 is used to supply heated or cooled water to a fan coil unit 28 or heat exchanger in an air conditioned space and the second conduit 40 is used to return the liquid from the fan coil unit 28 to the central air conditioning unit. Although two conduits are shown in the preferred embodiment, it is understood that a single conduit or a plurality of conduits can be included in a single cable 100 depending on the requirements of the hydronic HVAC system. Surrounding conduits 26 and 40 is a thermal insulation foam 120 which minimizes heat transfer from one conduit 26 to the other conduit 40 or from either conduit to ambient air. The foam insulation 120 by minimizing heat transfer before or after the liquid reaches the fan coil, improves system efficiency. The foam insulation 120 can be fabricated from any material having sufficient insulation qualities such as fiberglass or polyurethane foam. Surrounding and containing thermal insulating foam 120 is a plastic shell 130 which acts as a sheath to protect the foam 120 and conduits 26,40 from damage during installation. In addition, the shell 130 is made from a water impervious material such as polyvinyl chloride, polypropylene or polyethylene to prevent moisture from entering the foam 120 and reducing its thermal insulation qualities.

In another embodiment of the invention the cable incorporates 24 Vdc wiring 64 to operate the air circulation fan 32 at each fan coil unit and wiring 62 to connect the thermostat to the central heat pump 10 for control. Connectors are used at either end for connection to the register fan coil unit and to the central heat pump. No electrical or other wiring is thus required. With this approach, it is important that the cable be small and flexible. Splitting the total water flow into that required for each room assists in this goal. It is also desirable to use high water velocity in the transport lines to further reduce the required tube diameter. Typical requirements and water conditions for each room are indicated in Table I.

TABLE I

| Heating |
| --- |
| Delivery Rate = 12,000 Btu/hr |
| Water Temperature delta T = 40 degrees F. (120 —> 80 for 70 degrees F. room air temperature) |
| Water Flow Rate Required = 300 lb/hr = 0.600 gal/min Cooling |
| Delivery Rate = 6,000 Btu/hr |
| Water Temperature delta T = 20 degrees F. (40 —> 60 for 70 degrees F. room air temperature) |
| Water Flow Rate Required = 300 lb/hr = 0.600 gal/min |

In Table II, the pressure loss and pumping power required for delivering this water flow through 100 ft of smooth-wall tubing is presented. The variation with tube i.d. is large. A plastic tube with an i.d. of 3/16 inch and a 1/32-inch wall (o.d.=¼ inch) is reasonable, with a frictional pressure loss of 56 psi for 100 ft of tubing and an ideal pump power of 14.6 watts. For six identical circuits operating simultaneously, and assuming a combined motor/pump efficiency of 40 percent, the total pump power required is (14.6*6)/0.4=219 watts=0.294 hP.

TABLE II

| FLOW CHARACTERISTICS vs. TUBE SIZE FOR INDIVIDUAL ROOM CIRCUIT, WATER DISTRIBUTION m= | | | 300 lb/hr of water |
| --- | --- | --- | --- |
| Heating Rate= | | | 12,000 Btu/hr (120 —> 80 degrees F.) |
| Cooling Rate= | | | 6,000 Btu/hr (40 —> 60 degrees F.) |
| L= | | | 100 ft (Supply Plus Return Length) |
| Tube Inside Diameter (inches) | Frictional Press. Drop for 100 ft (psi) | Ideal Pump Power (watts) | Average Water Velocity (ft/sec) |
| 1/16 | 10,900 | 2,840 | 62.7 |
| ⅛ | 391 | 102 | 15.7 |
| 3/16 | 55.9 | 14.6 | 6.96 |
| ¼ | 14.0 | 3.66 | 3.92 |

Although the embodiments and examples described above apply to the "two pipe" hydronic distribution system, the present invention is also applicable to "four pipe" systems. Application to "four pipe" systems can be accomplished by using two cables 100 for each fan coil unit 28 or using a different embodiment (not shown) of cable 100 which includes another set of conduits 26,40 within insulation foam 120 and shell 130.

Figure 3A:
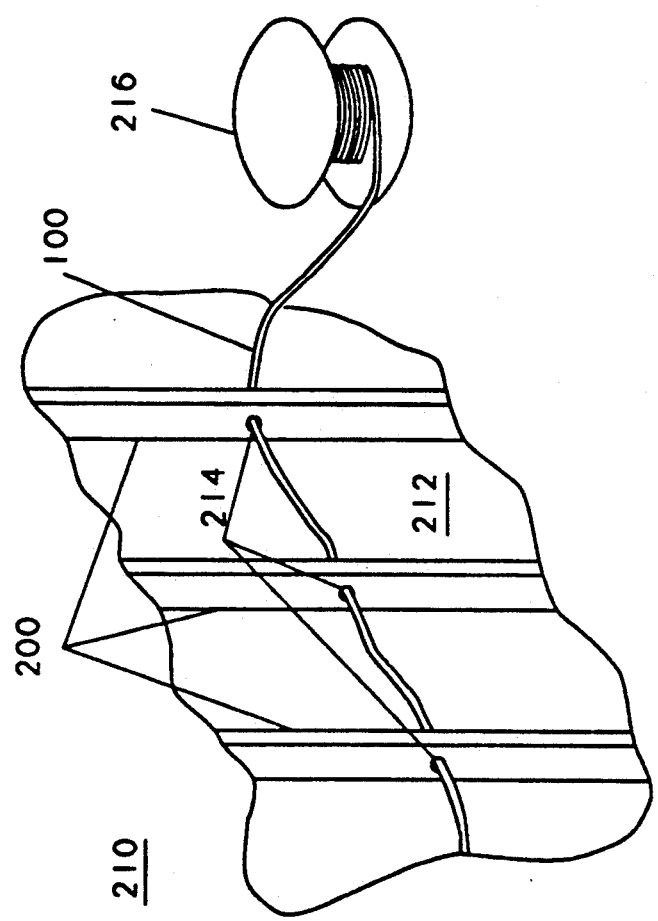
FIG. 3A, 3B and 3C are a perspective views of a partially completed building structure showing the installation of the flexible cable.
Figure 3B:
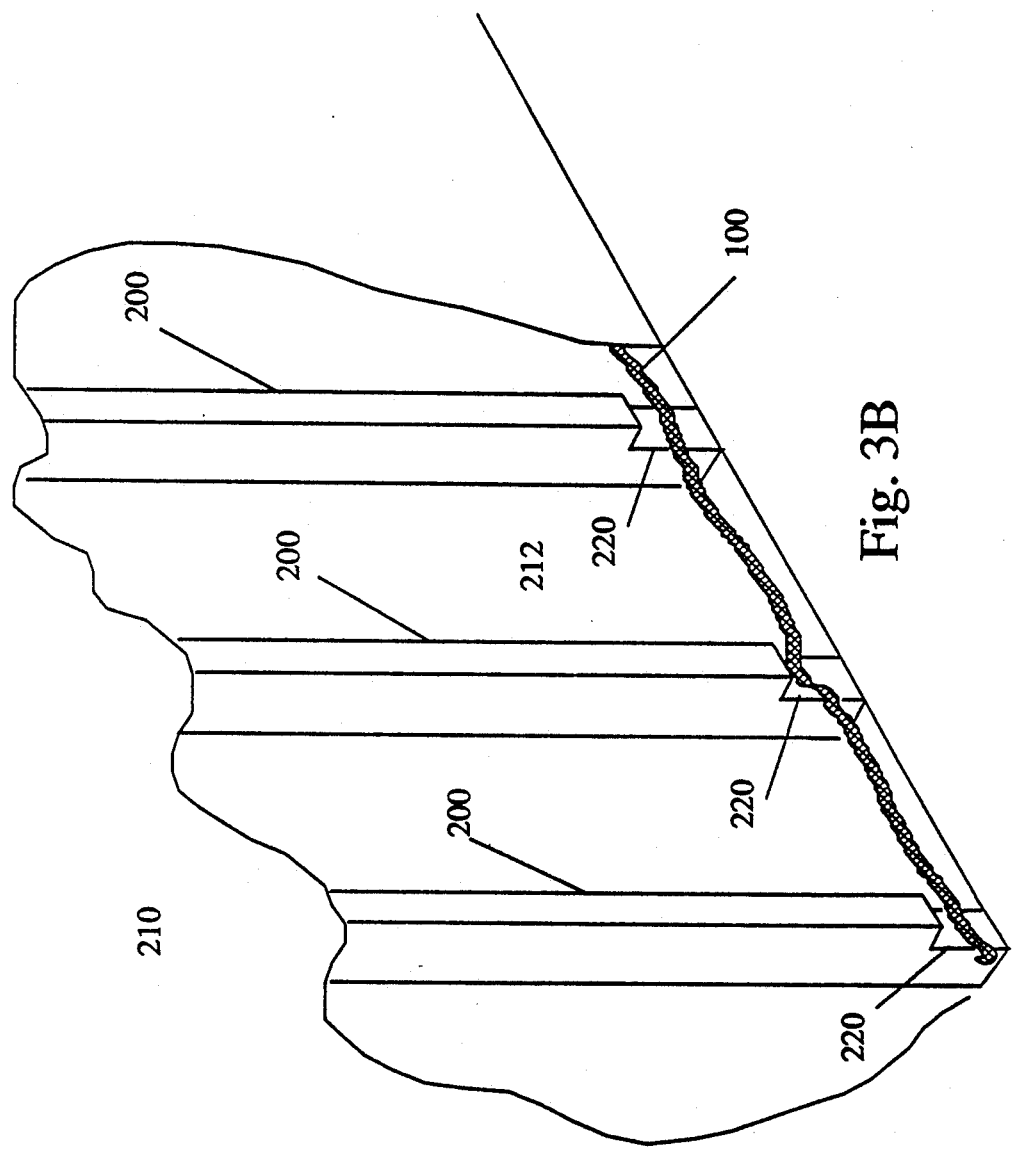
Figure 3C:
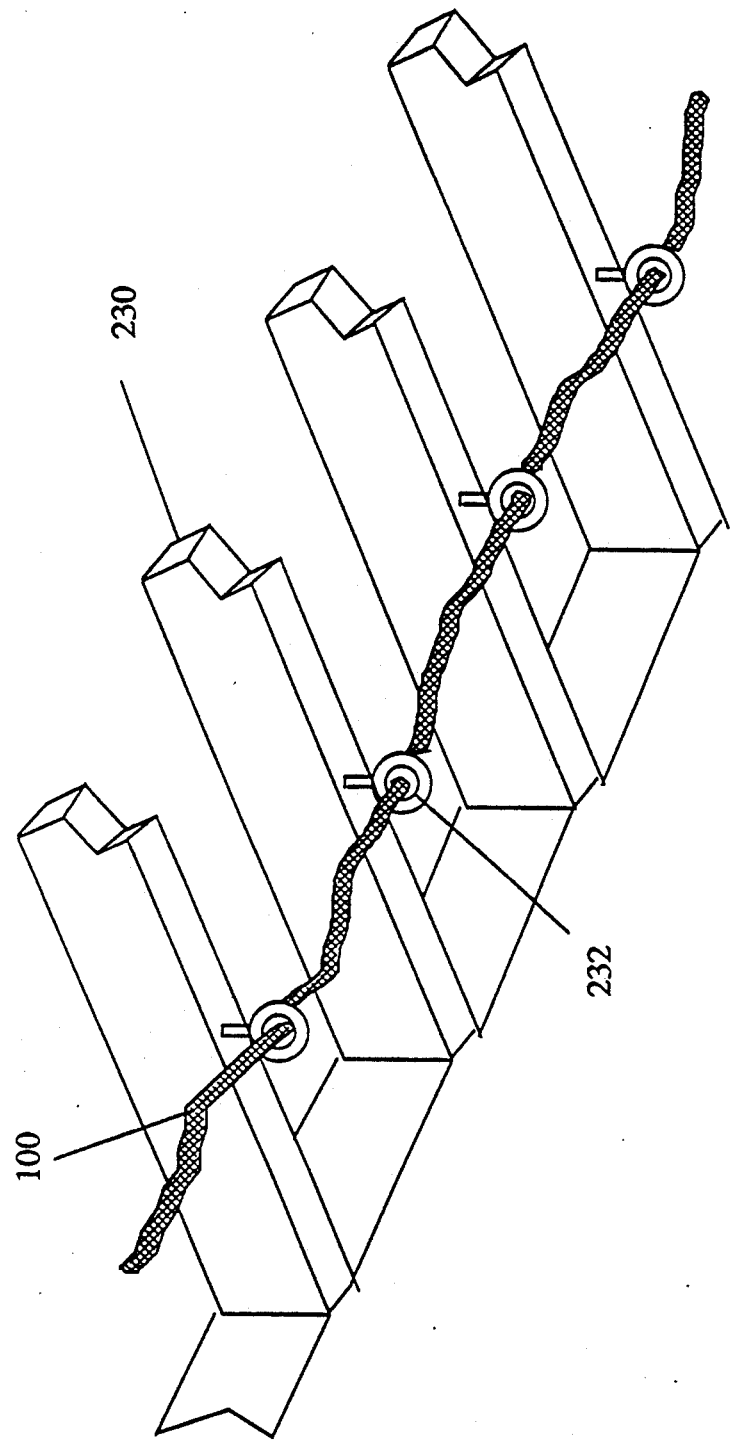

Turning now to FIG. 3A, a perspective view of a partially completed structure is shown. Typical of residence construction, the walls are formed from vertical wood studs 200 which are then covered by interior and exterior paneling 210,212. Prior to applying the paneling, holes 214 are bored in the studs and electrical cable is pulled through the holes to feed electrical power to wall outlets and switches. In this manner, the electrical cabling is hidden from view after the paneling is attached. The hydronic cable 100 of the present invention is shown being installed in a similar manner. The hydronic cable is pulled off a storage reel 216 and pulled through either the holes for the electrical cabling or additional holes. FIG. 3B shows a similar installation where the cable 100 is located in notches 220 cut in the studs 200 along the baseline FIG. 3C shows another installation where the cable 100 is attached to the bottom of floor joists 230 using hangers 232.

The hydronic thermal distribution system for heating and cooling and many of its attendant features will be understood from the foregoing description and it will be apparent that various changes may be made in its form, construction and arrangement of the parts thereof without departing from the spirit and scope of the invention or sacrificing all of its material advantages, the form hereinabove described being merely a preferred or exemplary embodiment thereof.

I claim:

1. A thermal distribution system for heating and/or cooling a plurality of enclosed spaces comprising:
   at least one fan coil unit located in each of said enclosed spaces, said fan coil units each including an air circulation fan;
   a centralized heat pump unit comprising:
     a heat pump containing a refrigerant;
     a first heat exchanger in fluid communication with said heat pump for transferring heat between said refrigerant ambient air;
     a second heat exchanger in communication with said heat pump, and adapted for circulation therethrough of said refrigerant and a distribution liquid in order to transfer heat between the distribution liquid and the refrigerant;
     a pump for circulating said distribution liquid through said second heat exchanger and through said fan coil units;
     a supply manifold located at said centralized heat pump unit for receiving distribution liquid from said second heat exchanger and directing said distribution liquid to said fan coil units;
     a return manifold located at said centralized heat pump unit and in fluid communication with said fan coil units and said second heat exchanger;
   a plurality of flexible, elastic cables each having therein an insulated, plastic supply tube and an insulated, plastic return tube for carrying distribution liquid, said supply tube having one end connected to said supply manifold and its opposite end connected to a fan coil unit, said return tube having one end connected to said fan coil unit and its opposite end connected to said return manifold;
   means for sensing temperature in each of said enclosed spaces; and
   means for controlling said air circulation fans in response to said temperature sensing means.

2. A thermal distribution system as in claim 1 further including a control unit, and wherein each of said flexible cables includes therein a first electrical wire connected between said control unit and the fan of a fan coil unit and a second electrical wire connected between said control unit and said temperature sensing means.

3. A thermal distribution system for heating and/or cooling a plurality of enclosed spaces comprising:
   at least one heat exchange unit located in each of said enclosed spaces;
   a centralized heat pump unit comprising:
      a heat pump containing a refrigerant;
      a first heat exchanger in fluid communication with said heat pump for transferring heat between said refrigerant and ambient air;
      a second heat exchanger in communication with said heat pump, and adapted for circulation therethrough of said refrigerant and a distribution liquid in order to transfer heat between the distribution liquid and the refrigerant;
      a pump for circulating said distribution liquid through said second heat exchanger and through said heat exchange units;
      a supply manifold for receiving distribution liquid from said second heat exchanger and directing said distribution liquid to said heat exchange units;
      a heater connected between said second heat exchanger and said supply manifold for further heating of said distribution liquid;
      a return manifold in fluid communication with said heat exchange units and said second heat exchanger;
      a bypass conduit between said supply manifold and said return manifold;
      a valve for controlling the flow of distribution liquid through said bypass conduit;
   a plurality of flexible, elastic cables each having therein an insulated, plastic supply tube and an insulated, plastic return tube for carrying distribution liquid, said supply tube having one end connected to said supply manifold and its opposite end connected to one of said heat exchange units, said return tube having one end connected to said heat exchange unit and its opposite end connected to said return manifold; and
   means for sensing temperature in each of said enclosed spaces and for controlling the flow of aid distribution liquid from the supply manifold to each of said heat exchange units in response to the sensed temperatures.

4. A thermal distribution system as in claim 3 wherein each of said heat exchange units includes a coil and a fan for circulating air into contact with said coil, said thermal distribution system further including, within each of said flexible cables, a wire for transmitting electrical signals to said fan to control its operation.

5. A thermal distribution system as in claim 3 further including a heater connected between said second heat exchanger and said supply manifold, and means for supplying electrical power to said heater.

* * * * *